United States Patent
Kawase et al.

(10) Patent No.: US 9,022,571 B2
(45) Date of Patent: May 5, 2015

(54) OPTICAL DEVICE WITH ADHESIVE BONDING LAYER AND SILOXANE BONDING LAYER WITH LEAVING GROUP, PROJECTION-TYPE IMAGING APPARATUS UTILIZING OPTICAL DEVICE, AND METHOD FOR PRODUCING OPTICAL DEVICE

(75) Inventors: Akiko Kawase, Kamiina-gun (JP); Mitsuru Miyabara, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 328 days.

(21) Appl. No.: 13/439,502

(22) Filed: Apr. 4, 2012

(65) Prior Publication Data
US 2012/0262674 A1 Oct. 18, 2012

(30) Foreign Application Priority Data
Apr. 15, 2011 (JP) ................ 2011-091173

(51) Int. Cl.
*G03B 21/14* (2006.01)
*G02B 5/30* (2006.01)
(Continued)

(52) U.S. Cl.
CPC .......... *G02B 6/4239* (2013.01); *G02B 6/3861* (2013.01); *C08J 5/12* (2013.01); *G02B 5/3033* (2013.01); *G02F 1/133528* (2013.01); *G02F 2202/28* (2013.01); *G03B 21/2073* (2013.01)
USPC ......... 353/20; 156/235; 156/349; 359/483.01

(58) Field of Classification Search
CPC ............... G02B 6/4239; G02B 6/3861; G02F 1/133528; G02F 2202/28; B29C 59/14; C08J 5/12; C08J 2483/04
USPC ................ 353/20; 156/235, 349; 359/483.01
See application file for complete search history.

(56) References Cited

U.S. PATENT DOCUMENTS 7,573,637 B2 8/2009 Gerlach et al.
7,643,211 B2 1/2010 Gerlach et al.
(Continued)

FOREIGN PATENT DOCUMENTS

CN 101806932 A 8/2010
CN 101995752 A 3/2011
(Continued)

OTHER PUBLICATIONS

Oct. 23, 2014 Office Action issued in U.S. Appl. No. 13/564,262.

*Primary Examiner* — Georgia Y Epps
*Assistant Examiner* — Magda Cruz
(74) *Attorney, Agent, or Firm* — Oliff PLC

(57) ABSTRACT

An optical device includes: a light transmissive first substrate; a light transmissive second substrate; a polarizing layer disposed between the first substrate and the second substrate; a first bonding layer which bonds the first substrate to the polarizing layer; and a second bonding layer which bonds the second substrate to the polarizing layer, wherein the first bonding layer is an adhesive layer, and the second bonding layer contains a structure of siloxane (Si—O) and a leaving group. By forming the first bonding layer of an adhesive layer, a necessary strength can be ensured, and also the optical properties can be enhanced by absorbing the irregularities of the polarizing layer formed of a synthetic resin so as to prevent the contamination with air bubbles. Since the time of exposure of the polarizing layer to heat generated by a plasma can be decreased, the polarizing layer is not deteriorated.

20 Claims, 13 Drawing Sheets

(51) Int. Cl.
*G02B 27/28* (2006.01)
*G02B 6/42* (2006.01)
*G02B 6/38* (2006.01)
*C08J 5/12* (2006.01)
*G02F 1/1335* (2006.01)
*G03B 21/20* (2006.01)

(56) References Cited

U.S. PATENT DOCUMENTS

| | | |
|---|---|---|
| 2007/0153381 A1 | 7/2007 | Komatsu et al. |
| 2007/0177084 A1* | 8/2007 | Ishitani et al. ............... 349/117 |
| 2008/0259230 A1 | 10/2008 | Miyakita et al. |
| 2008/0310020 A1 | 12/2008 | Hashimoto et al. |
| 2010/0151231 A1 | 6/2010 | Matsuo et al. |
| 2010/0245688 A1 | 9/2010 | Yanai et al. |
| 2011/0043712 A1 | 2/2011 | Yamakawa |
| 2012/0262674 A1 | 10/2012 | Kawase et al. |

FOREIGN PATENT DOCUMENTS

| | | |
|---|---|---|
| JP | A-10-039138 | 2/1998 |
| JP | A-11-095209 | 4/1999 |
| JP | A-2007-183335 | 7/2007 |
| JP | A-2008-509433 | 3/2008 |
| JP | B2-4228440 | 2/2009 |
| JP | A-2009-098465 | 5/2009 |
| JP | A-2009-099810 | 5/2009 |
| JP | B2-4337935 | 9/2009 |
| JP | A-2009-258404 | 11/2009 |
| JP | A-2009-271478 | 11/2009 |
| JP | A-2010-102272 | 5/2010 |
| JP | A-2010-117537 | 5/2010 |
| JP | A-2010-191203 | 9/2010 |
| JP | A-2010-224401 | 10/2010 |
| WO | WO 2009/008308 A1 | 1/2009 |

* cited by examiner

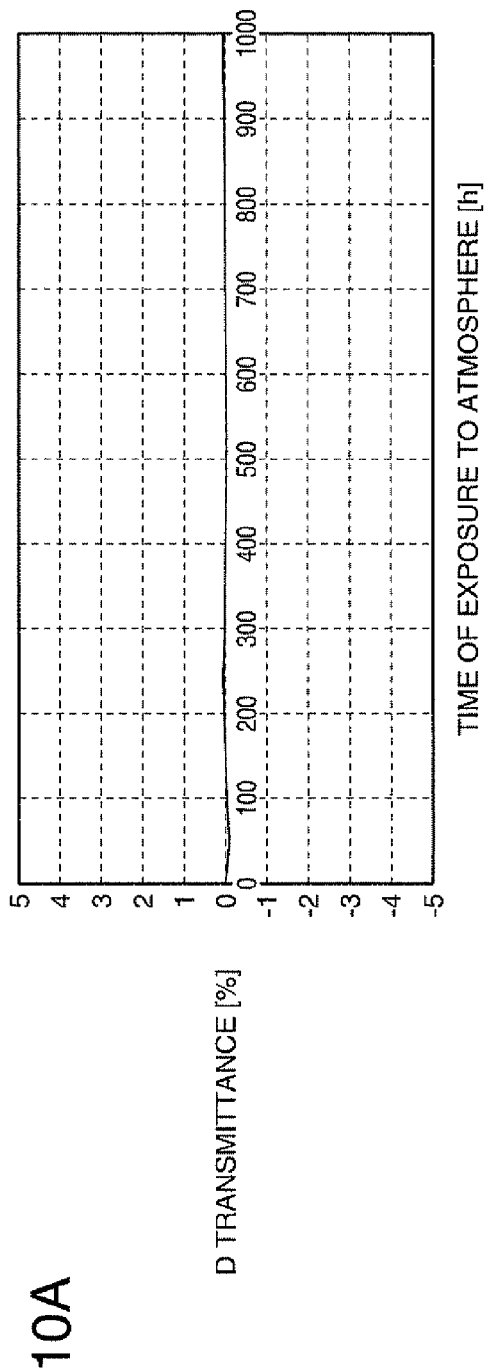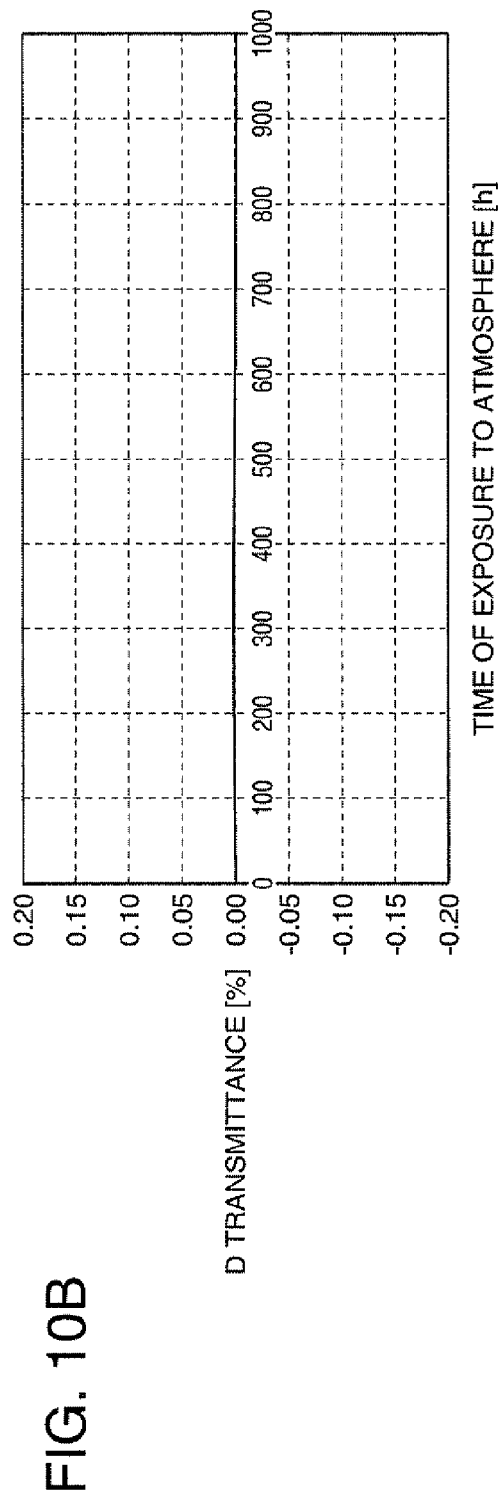
FIG. 10A
FIG. 10B

OPTICAL DEVICE WITH ADHESIVE BONDING LAYER AND SILOXANE BONDING LAYER WITH LEAVING GROUP, PROJECTION-TYPE IMAGING APPARATUS UTILIZING OPTICAL DEVICE, AND METHOD FOR PRODUCING OPTICAL DEVICE

BACKGROUND

1. Technical Field

The present invention relates to a polarizing plate, other optical devices, a projection-type imaging apparatus using such an optical device, and a method for producing an optical device.

2. Related Art

A projection-type imaging apparatus such as a liquid crystal projector is configured such that light from a light source is modulated by a light modulator according to image information to be projected and the light modulated by the light modulator is projected by a projection optical device. A polarizing plate is disposed between this light modulator and the light source.

In the related art, as the polarizing plate, there has been disclosed a polarizing plate obtained by bonding a polarizing film to glass (JP-A-10-039138). In JP-A-10-039138, as the polarizing film, for example, a polarizing film including iodine or a dichroic dye as a polarizer and a transparent polyvinyl alcohol (PVA) film as a substrate is disclosed, and the polarizing film has a thickness of 10 to 50 μm, more preferably about 25 to 35 μm. As the polarizing film, a so-called H film formed by stretching a PVA thin film while heating and immersing the film in a solution called an H ink containing a large amount of iodine (potassium iodide) to allow the film to absorb iodine, a film formed by allowing a polyvinyl butyral film to absorb iodine, a film formed by allowing a uniaxially stretched PVA film to absorb a dichroic dye, or the like is used.

Further, there has been disclosed a polarizing plate in which a bonding agent layer is formed on each of inner surfaces facing each other of transparent substrates facing and spaced apart from each other, and a polarizer composed of PVA or the like is provided on one of these bonding agent layers, and a retardation film is provided on the other bonding agent layer, and the polarizer and the retardation film are bonded to each other through a bonding agent layer, and exposed portions of the polarizer and the retardation film, which are not in contact with the bonding agent layers are sealed with a sealant (JP-A-2010-117537).

Further, there has been proposed a method for producing a polarizing plate in which transparent substrates are directly bonded to both surfaces of a polarizer with a bonding agent, wherein in order to prevent the occurrence of external shape abnormality such as wrinkles, a transparent substrate is bonded to one surface of a polarizer composed of PVA or the like with a bonding agent, followed by heating under pressure, and then, a transparent substrate is bonded to the other surface of the polarizer with a bonding agent (JP-A-2010-191203).

Recently, in a liquid crystal projector, the output of a white light source lamp is increased and an arc length is decreased, and therefore, a thermal load to each optical device mounted in an optical engine is being increased. An optical device in the related art cannot withstand light of a high luminance lamp and is deteriorated, resulting in decreasing the optical properties such as transmittance. Alternatively, a problem arises that an optical device made of a resin, a bonding agent, or the like is deformed due to heat.

That is, a polarizer made of, as a raw material, an organic film disclosed in JP-A-10-039138, JP-A-2010-117537, or JP-A-2010-191203 has a problem that a defect such as yellow discoloration due to light resulting from increasing the output or decreasing the arc length or heat generated by the light is caused.

Therefore, in the related art, there has been proposed a bonded article which includes: a first adherend having a first substrate and a first bonding layer which is formed by a plasma polymerization method on the first substrate, contains a structure of siloxane (Si—O) and having a crystallinity of 45% or less and also contains a leaving group which is composed of an organic group and binds to this structure of siloxane; and a second adherend having a second substrate and a second bonding layer which is formed by a plasma polymerization method on the second substrate, and has the same structure as the first bonding layer, wherein the first adherend and the second adherend are bonded to each other by a bonding property exhibited in each of a region on a surface of the first bonding layer and a region on a surface of the second bonding layer by applying energy to each of a region of at least a part of the first bonding layer and a region of at least a part of the second bonding layer so as to release the leaving group present in the vicinity of at least the surface of the first bonding layer and the second bonding layer from the structure of siloxane (Japanese Patent No. 4337935).

Further, in the related art, there has been proposed a polarizing plate formed by bonding a glass substrate to a polarizing film using the bonding layer proposed in Japanese Patent No. 4337935 (JP-A-2009-098465). The polarizing plate proposed in JP-A-2009-098465 includes a light transmissive substrate, a polarizing layer, and a bonding layer which bonds the substrate to the polarizing layer, and has a configuration such that the bonding layer contains a structure of siloxane which has an atomic structure containing a siloxane (Si—O) bond and a leaving group which binds to the structure of siloxane, and the bonding layer bonds the substrate to the polarizing layer by a bonding property exhibited in a region on a surface of the bonding layer by applying energy to a region of at least a part of the bonding layer so as to release the leaving group present in the vicinity of the surface of the bonding layer from the structure of siloxane.

Further, there has been proposed a laminated wave plate formed by bonding two quartz substrates to each other using the bonding layer described in Japanese Patent No. 4337935 in the same manner (JP-A-2009-258404).

Therefore, the present inventors tried to realize a polarizing plate having extremely high light resistance using the bonding layer proposed in Japanese Patent No. 4337935, JP-A-2009-098465, or JP-A-2009-258404 while using an organic film as a material of a polarizing device.

However, it was found that when a plasma-polymerized film is used as the bonding layer, the thickness of the bonding layer is several tens nanometers, for example, in the case of Japanese Patent No. 4337935, an extremely thin film having a thickness of 1 to 10000 nm, preferably 2 to 800 nm is used, and therefore, in the case where both principal surfaces of a film polarizer are sandwiched by inorganic light transmissive substrates, the irregularities of the surface of the film polarizer cannot be completely absorbed because the bonding layer is thin, and therefore, air bubbles and the like are incorporated to cause an external appearance defect, resulting in causing an adverse effect on the optical properties such as transmissibility. For example, PVA has a hygroscopic property and swells or shrinks depending on the humidity, and therefore, the film polarizer and the light transmissive substrates may be detached from each other.

Further, since the bonding layer is formed on both principal surfaces of the film polarizer by a plasma polymerization method, the time of exposure of the film polarizer to heat generated by a plasma is long, and therefore, a problem arises that the film polarizer itself is deteriorated or deformed.

SUMMARY

An advantage of some aspects of the invention is to provide an optical device having extremely high light resistance and excellent optical properties such as transmissibility, a projection-type imaging apparatus, and a method for producing an optical device.

Application Example 1

This application example of the invention is directed to an optical device including: a light transmissive first substrate; a light transmissive second substrate; a polarizing layer; a first bonding layer which bonds the first substrate to one principal surface of the polarizing layer; and a second bonding layer which bonds the second substrate to the other principal surface of the polarizing layer, wherein the first bonding layer is an adhesive, and the second bonding layer contains a structure of siloxane which has an atomic structure containing a siloxane (Si—O) bond and a leaving group which binds to the structure of siloxane.

In this application example having this configuration, the first bonding layer which bonds the first substrate to one principal surface of the polarizing layer is formed of an adhesive layer, for example, an acrylic adhesive layer, and therefore, a necessary strength can be ensured, and also the irregularities of the polarizing layer can be absorbed so as to prevent the contamination with air bubbles, whereby the optical properties can be enhanced. Further, since the time of exposure of the polarizing layer to heat generated by a plasma can be decreased, the deterioration or deformation of the polarizing layer itself can be prevented. In addition, the adhesive itself has superior light resistance and heat resistance to a bonding agent.

Moreover, since the second bonding layer which bonds the second substrate to the other principal surface of the polarizing layer is configured to contain a structure of siloxane and a leaving group, the heat resistance is improved, and a defect such as yellow discoloration of the optical device due to light resulting from increasing the output or decreasing the arc length or heat generated by the light can be avoided.

Accordingly, an optical device having a long life and excellent optical properties can be provided.

Application Example 2

This application example of the invention is directed to an optical device, wherein in the second bonding layer, a non-bonding group (dangling bond) of the structure of siloxane from which the leaving group is released among the structure of siloxane becomes an active group to bond the second substrate to the other principal surface of the polarizing layer.

According to this application example having this configuration, the bonding between the structure of siloxane and the leaving group can be reliably achieved, and therefore, the second substrate and the polarizing layer can be firmly bonded to each other.

Application Example 3

This application example of the invention is directed to an optical device, wherein the second bonding layer is formed by a plasma polymerization method.

In this application example having this configuration, a plasma polymerization method is used, and therefore, a second bonding layer which is dense and homogeneous can be formed.

Application Example 4

This application example of the invention is directed to an optical device, wherein the polarizing layer is formed of a synthetic resin selected from a polyvinyl alcohol, a polycarbonate, and a polyolefin.

In this application example having this configuration, the polarizing layer is formed of a material suitable for forming a polarizer such as a polyvinyl alcohol, a polycarbonate, or a polyolefin, and therefore, a polarizing plate can be easily produced.

Application Example 5

This application example of the invention is directed to an optical device, wherein the first substrate and the second substrate are formed of an inorganic material.

In this application example having this configuration, by using an inorganic material for the first substrate and the second substrate, the planarity is improved, and the retention of a given shape can be further improved.

Application Example 6

This application example of the invention is directed to an optical device, wherein the inorganic material is quartz or sapphire.

In this application example having this configuration, by using quartz or sapphire for the first substrate and the second substrate, the heat radiation property is improved, and the heat resistance can be further improved.

Application Example 7

This application example of the invention is directed to an optical device, wherein a sealing section is provided for sealing with a sealant an exposed portion of the polarizing layer, which is not in contact with the first bonding layer and the second bonding layer.

In this application example having this configuration, the polarizing layer is sealed by the sealing section so that the end thereof does not come in contact with the air, and therefore, not only is the heat resistance further improved, but also dew condensation is not caused. As a result, poor appearance or an adverse effect on transmissibility does not occur.

Application Example 8

This application example of the invention is directed to an optical device, wherein the second bonding layer has a thickness of 300 nm or more and 700 nm or less.

In this application example having this configuration, if the thickness of the second bonding layer composed of a plasma-polymerized film is less than 300 nm, the irregularities of the polarizing layer cannot be absorbed, and streaky fine air bubbles remain, and if the thickness thereof exceeds 700 nm, due to the heat during the film formation, the polarizing layer is shrunk and deformed from an outer peripheral portion thereof, and therefore, bonding failure is caused in the outer peripheral portion thereof.

Application Example 9

This application example of the invention is directed to a projection-type imaging apparatus including: a light source; a light modulator which modulates light from the light source according to image information; a projection optical device which projects the light modulated by the light modulator; and a polarizing plate disposed between the light modulator and the light source, wherein the polarizing plate is an optical device having the above-described configuration.

According to this application example having this configuration, a projection-type imaging apparatus capable of achieving the above-described effects can be provided.

Application Example 10

This application example of the invention is directed to a projection-type imaging apparatus, wherein the optical device is arranged so that the second substrate is disposed on a light incident side and the first substrate is disposed on a light exit side.

In this application example having this configuration, the second bonding layer is disposed at a position closer to the light source than the first bonding layer formed of an adhesive, and therefore, even if the optical device is irradiated with light from the light source at a high illumination intensity, the deterioration of the adhesive due to heat or light can be prevented.

Application Example 11

This application example of the invention is directed to a projection-type imaging apparatus, wherein the light modulator is a liquid crystal panel.

According to this application example having this configuration, in the projection-type imaging apparatus using the liquid crystal panel, the above-described effects can be achieved.

Application Example 12

This application example of the invention is directed to a method for producing an optical device including: an adhesion step of bonding the first substrate to one principal surface of the polarizing layer with an adhesive; a first bonding layer formation step of forming a first bonding layer, which contains a structure of siloxane that has an atomic structure containing a siloxane (Si—O) bond and a leaving group that binds to the structure of siloxane, on at least one principal surface of the other principal surface of the polarizing layer and a principal surface of the second substrate; a first surface activation step of activating the first bonding layer formed in the first bonding layer formation step; and a bonding step of bonding the polarizing layer to the second substrate so as to integrate the members.

According to this application example having this configuration, an optical device having the above-described effects can be efficiently produced.

Application Example 13

This application example of the invention is directed to a method for producing an optical device, further including a surface activation step of activating the principal surface on which the first bonding layer is not formed among the other principal surface of the polarizing layer and the principal surface of the second substrate.

In this application example having this configuration, by activating the principal surface on which the first bonding layer is not formed among the other principal surface of the polarizing layer and the principal surface of the second substrate, the plasma-polymerized film formation step is simplified, and the polarizing layer and the second substrate can be bonded to each other.

Application Example 14

This application example of the invention is directed to a method for producing an optical device, further including: a second bonding layer formation step of forming a second bonding layer, which contains a structure of siloxane that has an atomic structure containing a siloxane (Si—O) bond and a leaving group that binds to the structure of siloxane, also on the principal surface on which the first bonding layer is not formed among the other principal surface of the polarizing layer and the principal surface of the second substrate; and a second surface activation step of activating the second bonding layer formed in the second bonding layer formation step.

In this application example having this configuration, the same plasma-polymerized film is formed on both of the polarizing layer and the second substrate, and therefore, bonding can be reliably achieved.

BRIEF DESCRIPTION OF THE DRAWINGS

The invention will be described with reference to the accompanying drawings, wherein like numbers reference like elements.

FIGS. 10A and 10B are graphs showing the results of Example for the evaluation of reliability.

DESCRIPTION OF EXEMPLARY EMBODIMENTS

Figure 1:
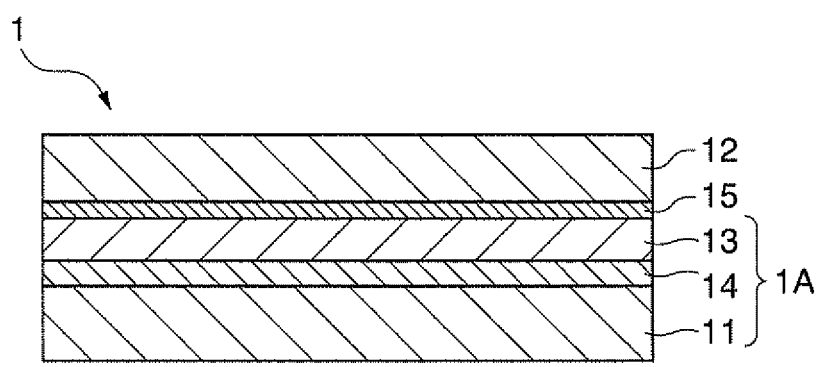
FIG. 1 is a cross-sectional view showing an optical device according to a first embodiment of the invention.

Hereinafter, embodiments of the invention will be described with reference to the accompanying drawings. Note that in the description of the respective embodiments, the same reference numerals and symbols are attached to the same constituent elements, and the description thereof is omitted or simplified.

A first embodiment will be described with reference to FIGS. 1 to 5D.

In FIG. 1, a cross section of an optical device according to the first embodiment is shown.

In FIG. 1, an optical device 1 according to the first embodiment is a polarizing plate provided with: a light transmissive first substrate 11; a light transmissive second substrate 12; a polarizing layer 13 as a synthetic resin layer; a first bonding layer 14 which bonds the first substrate 11 to one principal surface of the polarizing layer 13; and a second bonding layer 15 which bonds the second substrate 12 to the other principal surface of the polarizing layer 13. The optical device 1 according to the first embodiment is used in a projection-type imaging apparatus such as a liquid crystal projector, or other electronic apparatuses.

Each of the first substrate 11 and the second substrate 12 has a thickness of 700 µm±100 µm (600 µm or more and 800 µm or less), and is a plate material having a rectangular planar shape.

As a material of the first substrate 11 and the second substrate 12, for example, a light transmissive inorganic material is used. Specific examples thereof include a silicate glass, a borosilicate glass, a titanium silicate glass, a fluoride glass such as a zirconium fluoride glass, fused quartz, quartz crystal, sapphire, a YAG crystal, fluorite, magnesia, and spinel ($MgO \cdot Al_2O_3$). By forming the light transmissive first substrate 11 and the light transmissive second substrate 12 of an inorganic material, the planarity is improved, and the retention of a given shape can be improved. Further, among these materials, a material having a thermal conductivity of 5 W/mK or more is preferred from the viewpoint of efficiently radiating heat generated in the polarizing layer 13 to the outside to decrease the temperature of the polarizing layer 13. Examples of such a material include sapphire (thermal conductivity: 40 W/mK) and quartz crystal (thermal conductivity: 8 W/mK).

The outer surfaces of the first substrate 11 and the second substrate 12 which are in contact with the air are subjected to an antireflection treatment according to the wavelength of light to be used. Examples of the antireflection treatment include the formation of a dielectric multilayer film by a sputtering method or a vacuum vapor deposition method, and a method of providing one or more low-refractive index layers by coating. The antireflection surfaces may also be subjected to an antifouling treatment for preventing dirt from adhering to the surfaces. Examples of the antifouling treatment include the formation of a thin film layer containing fluorine in such an amount that it does not practically affect the antireflective performance on the surface.

The polarizing layer 13 is a polarizer formed of a synthetic resin selected from a polyvinyl alcohol (PVA), a polycarbonate, and a polyolefin, and has a thickness of 25 µm±10 µm (15 µm or more and 35 µm or less), and is a film-shaped member having the same planar shape as that of the first substrate 11 and the second substrate 12.

As the polarizing layer 13, there are a polarizing layer of a type called K-type polarizer, K-sheet, or KE-film, and a polarizing layer of a type called H-type polarizer.

The polarizing layer of a type called K-type polarizer is, for example, a polarizer produced by dehydrating a PVA-based resin to form a double bond in a main chain. In order to produce a K-type polarizer, for example, the following method can be used. A polymer sheet containing a hydroxylated linear polymer such as PVA is uniaxially stretched, the hydroxylated linear polymer of this polymer sheet is oriented along the stretching direction, the resulting oriented sheet is bonded to a support, the supported oriented sheet is treated under a condition sufficient to effect catalytic dehydration of the oriented sheet, whereby a light-absorbing vinylene block segment is formed in the polymer.

The polarizing layer of a type called H-type polarizer is a polarizer produced by, for example, using dichroic iodine, a dichroic dye, or the like for a PVA-based resin subjected to a stretching treatment, and PVA chains are crosslinked using boric acid.

The first bonding layer 14 is an adhesive layer formed of an acrylic-based or silicone-based adhesive and has a thickness of 15 µm±5 µm (10 µm or more and 20 µm or less).

The second bonding layer 15 is composed of a plasma-polymerized film (see FIGS. 3A to 4B) which has: a first adherend having a first bonding layer 151 formed by a plasma polymerization method on the polarizing layer 13, containing a structure of siloxane 153 which contains a siloxane (Si—O) bond and has a crystallinity of 45% or less, and also containing a leaving group 15C which is composed of an organic group and binds to the structure of siloxane 15B; and a second adherend having a second bonding layer 152 formed by a plasma polymerization method on the second substrate 12 and made of the same material as the first bonding layer 151. The second bonding layer 15 has a thickness of 300 nm or more and 700 nm or less. If the thickness of the second bonding layer 15 is set to less than 300 nm, the irregularities of the polarizing layer 13 cannot be absorbed and streaky fine air bubbles remain, and if the thickness of the second bonding layer 15 is set to more than 700 nm, due to the heat during the film formation, the polarizing layer 13 is shrunk and deformed from an outer peripheral portion thereof.

Subsequently, the method for producing the optical device 1 according to the first embodiment will be described with reference to FIGS. 2 to 5D.

1. Adhesion Step

The first substrate 11 and the polarizing layer 13 are bonded to each other with an adhesive.

Therefore, an adhesive is applied to both or one of the first substrate 11 and the polarizing layer 13, and the first substrate 11 and the polarizing layer 13 are bonded to each other. Unlike the case of using a bonding agent, a UV curing step is not needed when the first substrate 11 and the polarizing layer 13 are bonded to each other.

In a state where the first substrate 11 and the polarizing layer 13 are bonded to each other, a polarizing plate unit 1A in which the first bonding layer 14 is formed between the first substrate 11 and the polarizing layer 13 is formed.

2. Plasma-Polymerized Film Formation Step

Subsequently, a step of forming a plasma-polymerized film will be described.

First, an apparatus for forming a plasma-polymerized film will be described.

Figure 2:
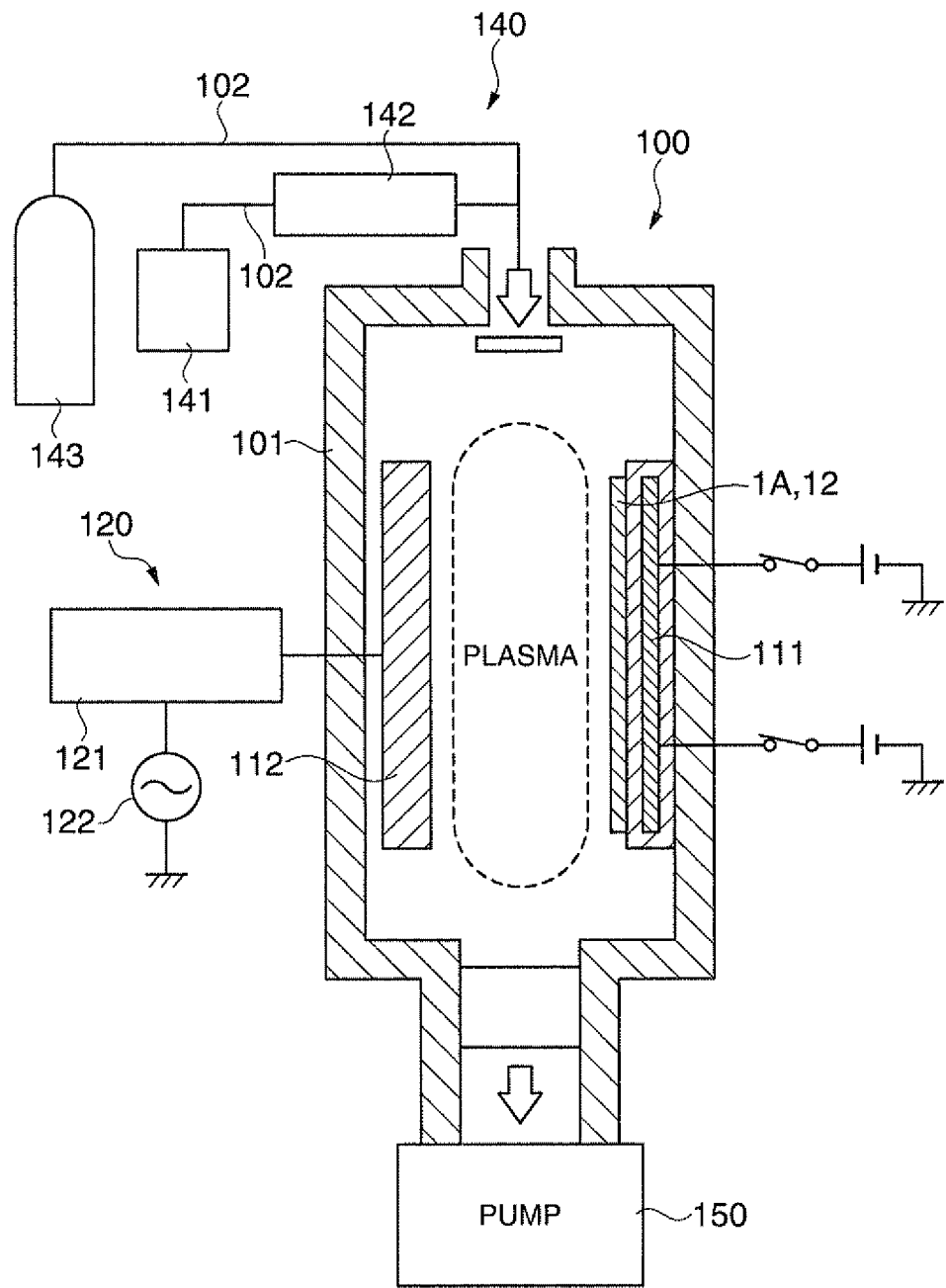
FIG. 2 is a schematic structural view of a plasma polymerization apparatus.

FIG. 2 is a schematic structural view of a plasma polymerization apparatus.

In FIG. 2, a plasma polymerization apparatus 100 is provided with a chamber 101, a first electrode 111 and a second electrode 112, each of which is provided in the chamber 101, a power supply circuit 120 which applies a high-frequency voltage between the first electrode 111 and the second electrode 112, a gas supply unit 140 which supplies a gas into the chamber 101, and an exhaust pump 150 which exhausts the gas inside the chamber 101.

The power supply circuit 120 has a matching box 121 and a high-frequency power supply 122. The gas supply unit 140 has a liquid storage unit 141 which stores a liquid film material (a raw material liquid), a vaporizer 142 which vaporizes the liquid film material to form a raw material gas, a gas cylinder 143 which stores a carrier gas, and a pipe 102 which connects these members. The carrier gas stored in the gas cylinder 143 is a gas to be introduced into the chamber 101 for maintaining electric discharge caused by an electric field, and examples thereof include argon gas and helium gas.

The film material stored in the liquid storage unit 141 is a raw material for forming a plasma-polymerized film on the first substrate 11 or the second substrate 12 by the plasma polymerization apparatus 100. Examples of the raw material gas include organosiloxanes such as hexamethyldisiloxane, octamethyltrisiloxane, decamethyltetrasiloxane, decamethylcyclopentasiloxane, octamethylcyclotetrasiloxane, and methylphenylsiloxane. A polyorganosiloxane generally has water repellency, however, an organic group thereof can be easily released through any of various activation treatments, and therefore, a polyorganosiloxane can be easily converted into a hydrophilic compound.

2-1. Bonding Layer Formation Step

Subsequently, a first bonding layer formation step of forming a first bonding layer by a plasma polymerization method on a plane surface of the polarizing layer 13 of the polarizing plate unit 1A, and a second bonding layer formation step of forming a second bonding layer by a plasma polymerization method on a plane surface of the second substrate 12 are performed.

Figure 3A:
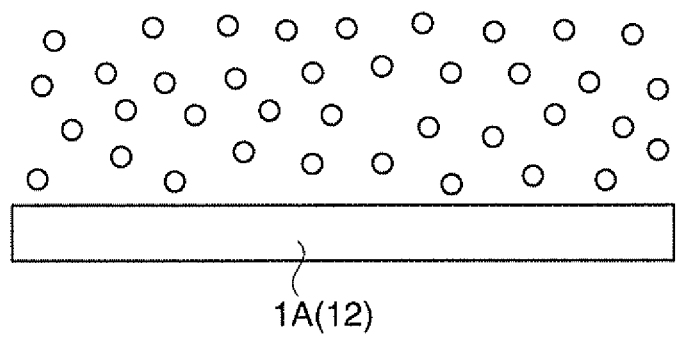
FIGS. 3A to 3D are views illustrating a state where a plasma-polymerized film is formed on a polarizing layer.
Figure 3B:
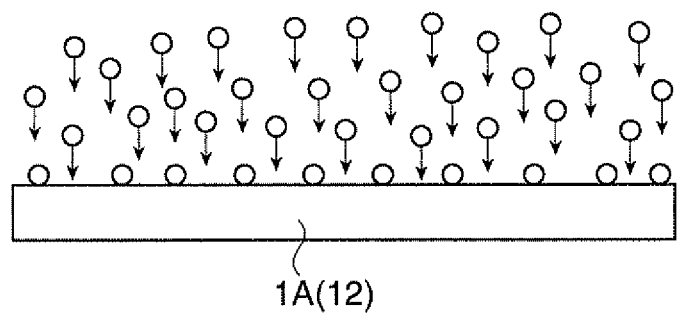
Figure 3C:
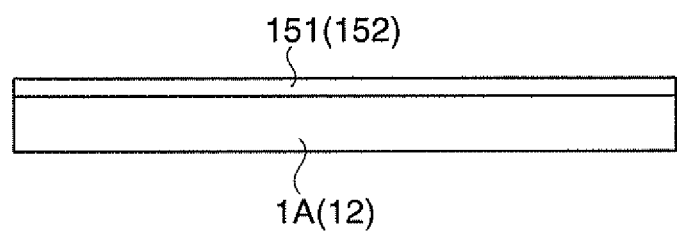
Figure 3D:
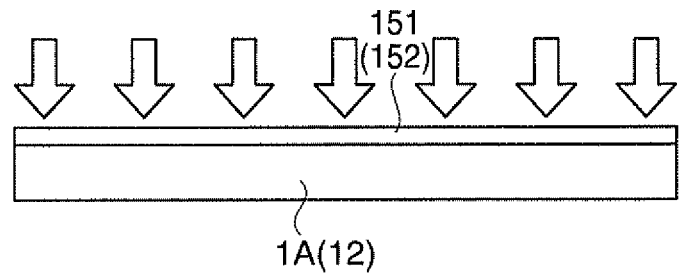
Figure 4A:
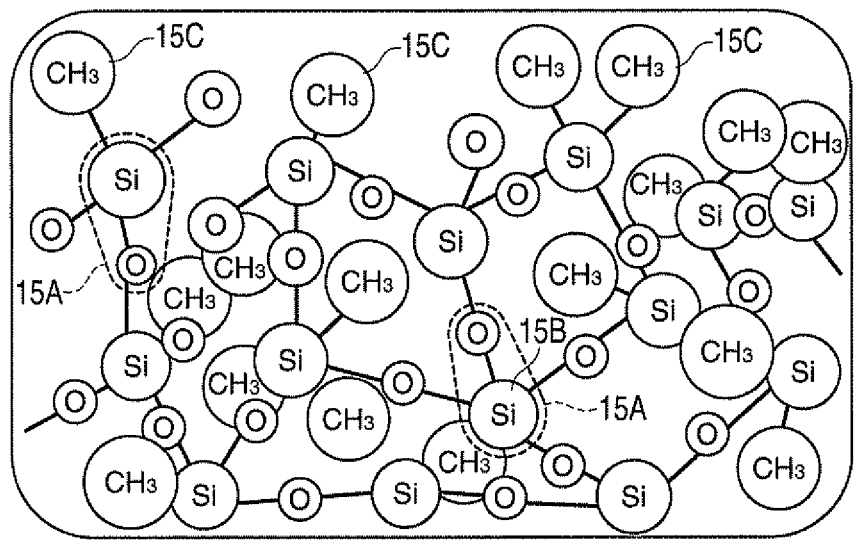
FIG. 4A is a schematic view illustrating a molecular structure before energy is applied to the plasma-polymerized film.
Figure 4B:
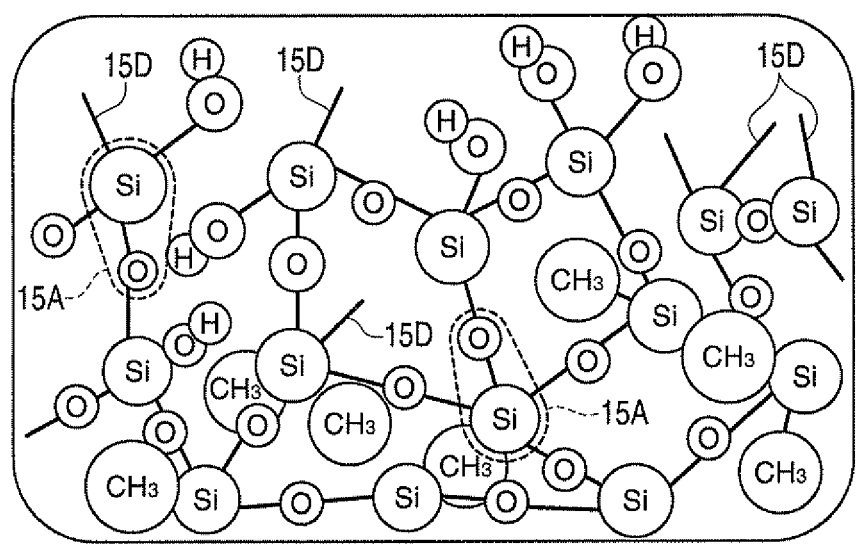
FIG. 4B is a schematic view illustrating a molecular structure after energy is applied to the plasma-polymerized film.

FIGS. 3A to 3D are views illustrating a state where a plasma-polymerized film is formed on the polarizing layer, FIG. 4A is a schematic view illustrating a molecular structure before energy is applied to the plasma-polymerized film, and FIG. 4B is a schematic view illustrating a molecular structure after energy is applied to the plasma-polymerized film.

As shown in FIGS. 3A to 3C, the first bonding layer 151 is formed on the polarizing layer 13 of the polarizing plate unit 1A, and the second bonding layer 152 is formed on a plane surface of the second substrate 12. In this step, a predetermined amount of oxygen is introduced into the chamber 101 while allowing the first electrode 111 of the plasma polymerization apparatus 100 to hold the polarizing plate unit 1A or the second substrate 12, and also a high-frequency voltage is applied between the first electrode 111 and the second electrode 112 from the power supply circuit 120, whereby the optical member itself is activated (substrate activation).

Thereafter, the gas supply unit 140 is activated, and a mixed gas of the raw material gas and the carrier gas is supplied into the chamber 101. The chamber 101 is filled with the supplied mixed gas, and the polarizing layer 13 of the polarizing plate unit 1A or the second substrate 12 is exposed to the mixed gas.

By applying a high-frequency voltage between the first electrode 111 and the second electrode 112, the molecules of the gas present between these electrodes 111 and 112 are ionized, whereby a plasma is generated. By the energy of the plasma, the molecules of the raw material gas are polymerized, and as shown in FIG. 3B, the resulting polymerized product is adhered and deposited onto the surface of the polarizing layer 13 of the polarizing plate unit 1A or the second substrate 12. As a result, as shown in FIG. 3C, the first bonding layer 151 is formed on the polarizing layer 13 of the polarizing plate unit 1A, or the second bonding layer 152 is formed on the second substrate 12. The first bonding layer 151 and the second bonding layer 152 are each a plasma-polymerized film.

Here, the film formation temperature (the temperature of the substrate on which a film is formed) is 65° C. or higher and 85° C. or lower.

If the film formation temperature is lower than 65° C., the polarizing layer 13 in the form of a film is not softened, and minute irregularities cannot be compressed or deformed, and therefore, streaky fine air bubbles remain. If the film formation temperature exceeds 85° C., the polarizing layer 13 in the form of a film is shrunk and deformed from an outer peripheral portion thereof due to the heat during film formation, and therefore, bonding failure is caused in the outer peripheral portion thereof. That is, if the temperature of the substrate is within the range of 65° C. to 85° C., an effect of the irregularities of the polarizing layer 13 in the form of a film can be eliminated and also bonding failure caused by thermal shrinkage deformation can be avoided.

2-2. Surface Activation Step

The plasma-polymerized film formed in the bonding layer formation step is activated.

As shown in FIG. 3D, energy is applied to the first bonding layer 151 and the second bonding layer 152, thereby activating the surfaces thereof. In this step, for example, a method of irradiation with a plasma, a method of contacting with ozone gas, a method of treatment with ozone water, a method of treatment with an alkali, or the like can be used. Among these methods, a method of irradiation with a plasma is preferred for efficiently activating the surfaces of the first bonding layer 151 and the second bonding layer 152. As the plasma, for example, oxygen, argon, nitrogen, air, water, and the like are used alone or in admixture of two or more kinds.

As shown in FIG. 4A, the first bonding layer 151 or the second bonding layer 152, each of which is a plasma-polymerized film before energy is applied, contains a structure of siloxane 15B which contains a siloxane (Si—O) bond 15A and has a random atomic structure, and a leaving group 15C which binds to the structure of siloxane 15B, and is a film which is easily deformed. The reason is considered to be that the crystallinity of the structure of siloxane 15B is decreased, and therefore, a defect such as dislocation or shear in a crystal grain boundary is liable to occur.

When energy is applied to the first bonding layer 151 and the second bonding layer 152 each having such a structure, as shown in FIG. 4B, the leaving group 15C is released from the structure of siloxane 15B. Due to this, an active group 15D is generated on the surface and in the inside of the first bonding layer 151 and the second bonding layer 152, whereby activation is achieved. As a result, a bonding property is exhibited on the surfaces of the first bonding layer 151 and the second bonding layer 152. When such a bonding property is exhibited, the first bonding layer 151 and the second bonding layer 152 can be firmly bonded to each other. Incidentally, the crystallinity of the structure of siloxane 15B of the first bonding layer 151 and the second bonding layer 152 is preferably 45% or less, more preferably 40% or less. If the crystallinity thereof falls within such a range, the structure of siloxane 15B has a sufficiently random atomic structure, and as a result, the characteristics of the structure of siloxane 15B become obvious.

The "activation" as used herein refers to a state where the leaving group 150 on the surface or in the inside of the first bonding layer 151 or the second bonding layer 152 is released, whereby a bonding group which is not terminated (hereinafter also referred to as "non-bonding group" or "dangling bond") is generated in the structure of siloxane 15B, or a state where the non-bonding group is terminated by a hydroxy group (OH group), or a state where the both states are mixed together.

Accordingly, the active group 15D refers to a non-bonding group (dangling bond) or a group in which a non-bonding group is terminated by a hydroxy group, and such an active group 15D can achieve firm bonding between the first bonding layer 151 and the second bonding layer 152.

3. Bonding Step

The polarizing layer 13 and the second substrate 12 are bonded to each other so as to integrate the members.

FIGS. 5A to 5D are views illustrating a bonding step.

Figure 5A:
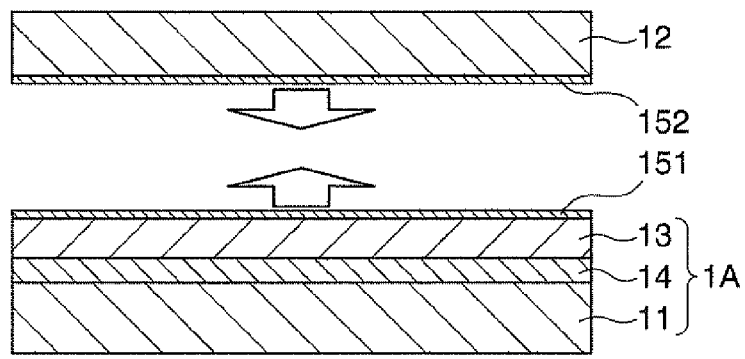
FIGS. 5A to 5D are views illustrating a bonding step.
Figure 5B:
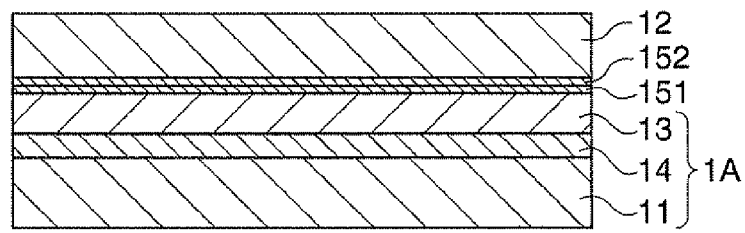

First, as shown in FIG. 5A, the polarizing layer 13 and the second substrate 12 are pressed against each other in a state where the first bonding layer 151 and the second bonding layer 152 formed of the plasma-polymerized film face each other. Then, as shown in FIG. 5B, by bonding the first bonding layer 151 to the second bonding layer 152, these members are bonded to each other.

Figure 5C:
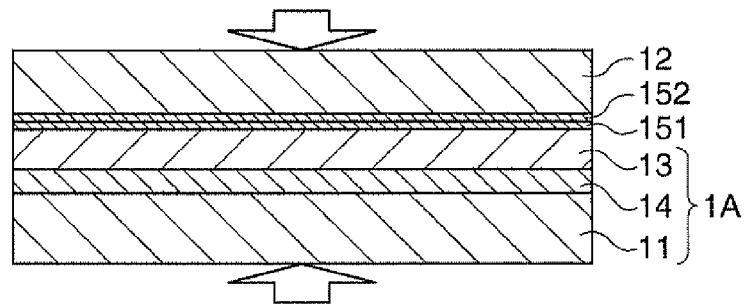
Figure 5D:
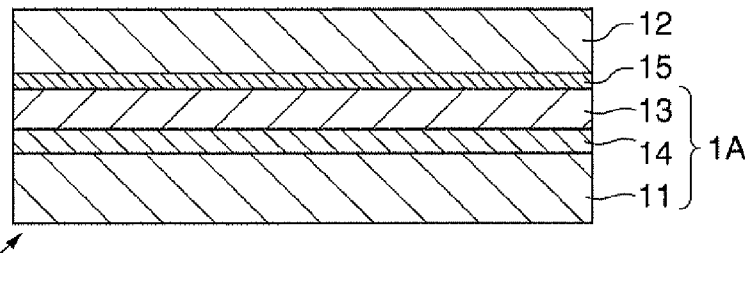

After the bonding step, as shown in FIG. 5C, the polarizing layer 13 and the second substrate 12 are pressurized, whereby as shown in FIG. 5D, the first bonding layer 151 and the second bonding layer 152 are integrated to become the second bonding layer 15, whereby the optical device 1 is produced. After pressurizing the polarizing layer 13 and the second substrate 12, these members are heated. By this heating operation, the bonding strength can be increased. The resulting optical device 1 is appropriately diced.

The applied pressure during the pressurization is preferably 3 MPa or more, and the temperature during the pressurization is preferably 20° C. or higher and 50° C. or lower. If the temperature during the pressurization exceeds 50° C., the acrylic adhesive constituting the first bonding layer 14 is plastically deformed due to heat, and the bonding layer 14 protrudes from the outer periphery by the pressurization force. Therefore, it is preferred to pressurize the members at a temperature in a range in which the first bonding layer 14 is not plastically deformed. Further, it is difficult to control the temperature lower than 20° C., and therefore, the temperature during the pressurization is preferably 20° C. or higher and 50° C. or lower. However, in the case of using an adhesive, the hardness of which can be maintained at a high temperature, it is possible to pressurize the members at a higher temperature.

Accordingly, in the first embodiment, the following operation and effect can be obtained.

(1) The optical device 1 is configured to include: the light transmissive first substrate 11; the light transmissive second substrate 12; the polarizing layer 13 disposed between the first substrate 11 and the second substrate 12; the first bonding layer 14 which bonds the first substrate 11 to one principal surface of the polarizing layer 13; and the second bonding layer 15 which bonds the second substrate 12 to the other principal surface of the polarizing layer 13, wherein the first bonding layer 14 is an adhesive layer, and the second bonding layer 15 contains a structure of siloxane which has anatomic structure containing a siloxane (Si—O) bond and a leaving group which binds to the structure of siloxane. Therefore, since the first bonding layer 14 which bonds the first substrate 11 to one principal surface of the polarizing layer 13 is formed of an adhesive layer, a necessary strength can be ensured, and also the irregularities of the polarizing layer 13 made of a synthetic resin can be absorbed so as to prevent the contamination with air bubbles, whereby the optical properties can be enhanced. Further, since the time of exposure of the polarizing layer 13 to heat generated by a plasma can be decreased, the deterioration or the like of the polarizing layer 13 can be prevented. Accordingly, the optical device 1 having a long life and excellent optical properties can be provided.

(2) In the second bonding layer 15, a non-bonding group (dangling bond) of the structure of siloxane 15B from which the leaving group 15C is released becomes an active group 15D to bond the second substrate 12 to the other principal surface of the polarizing layer 13, and therefore, such an active group 15D can achieve firm bonding between the first bonding layer 151 and the second bonding layer 152 formed of the plasma-polymerized film, and the second substrate 12 and the polarizing layer 13 are not detached from each other.

(3) Since the second bonding layer 15 is formed by a plasma polymerization method, the first bonding layer 151 and the second bonding layer 152, both of which are dense and homogeneous, can be formed, respectively. As a result, the polarizing layer 13 on which the first bonding layer 151 is formed and the second substrate 12 on which the second bonding layer 152 is formed can be reliably bonded to each other, and therefore, the second substrate 12 is not detached from the polarizing layer 13.

(4) If the polarizing layer 13 is formed of a polyvinyl alcohol, a polycarbonate, or a polyolefin, a polarizing plate can be easily produced because such a material is suitable for forming a polarizer.

(5) If the first substrate 11 and the second substrate 12 are formed of quartz or sapphire, the heat radiation property is improved, and the heat resistance can be further improved as compared with the case where the substrates are formed of glass.

(6) Since the thickness of the second bonding layer 15 is set to 300 nm or more and 700 nm or less, the irregularities of the polarizing layer 13 are absorbed, and air bubbles do not remain thereon. Further, the polarizing layer 13 is not shrunk or deformed due to the heat during film formation, and therefore, the outer appearance of the optical device 1 is enhanced.

(7) In order to produce the optical device 1, the adhesion step of bonding the first substrate 11 to one principal surface of the polarizing layer 13 with an adhesive, the bonding layer formation step of forming the first bonding layer 151, which contains a structure of siloxane 15B and a leaving group 15C that binds to the structure of siloxane 15B, on the other principal surface of the polarizing layer 13 and forming the second bonding layer 152, which contains a structure of siloxane 15B and a leaving group 15C that binds to the structure of siloxane 15B, on the second substrate 12, the surface activation step of activating the first bonding layer 151 and the second bonding layer 152 formed in the bonding layer formation step, and the bonding step of bonding the polarizing layer 13 to the second substrate 12 so as to integrate the members are performed, and therefore, the optical device 1 can be efficiently produced.

(8) Particularly, in this embodiment, the first bonding layer formation step and the second bonding layer formation step are performed for forming the first bonding layer 151 and the second bonding layer 152 on the principal surfaces of both of the polarizing layer 13 and the second substrate 12, respectively, and therefore, the polarizing layer 13 and the second substrate 12 can be more reliably bonded to each other.

Subsequently, a second embodiment according to the invention will be described with reference to FIGS. 6 to 7E.

The second embodiment is different from the first embodiment in the shape of the optical device, and the others are the same as those of the first embodiment.

Figure 6:
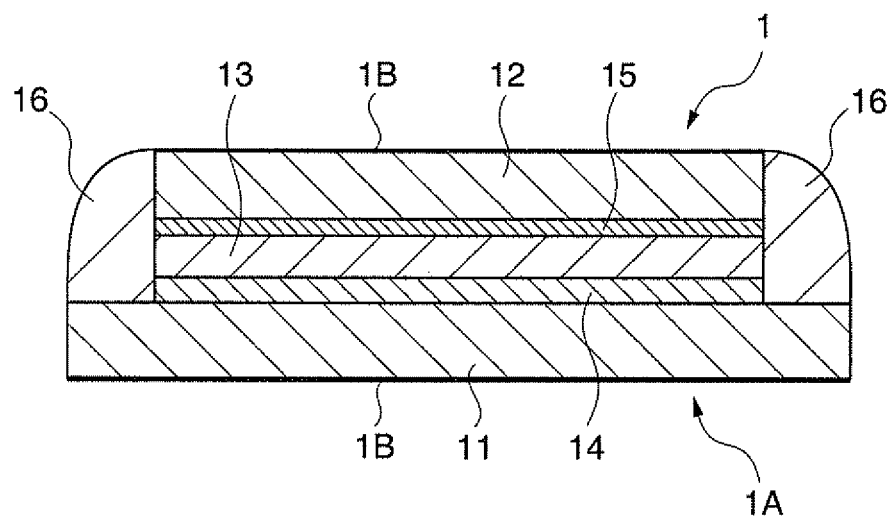
FIG. 6 is a cross-sectional view showing an optical device according to a second embodiment of the invention.
Figure 7:
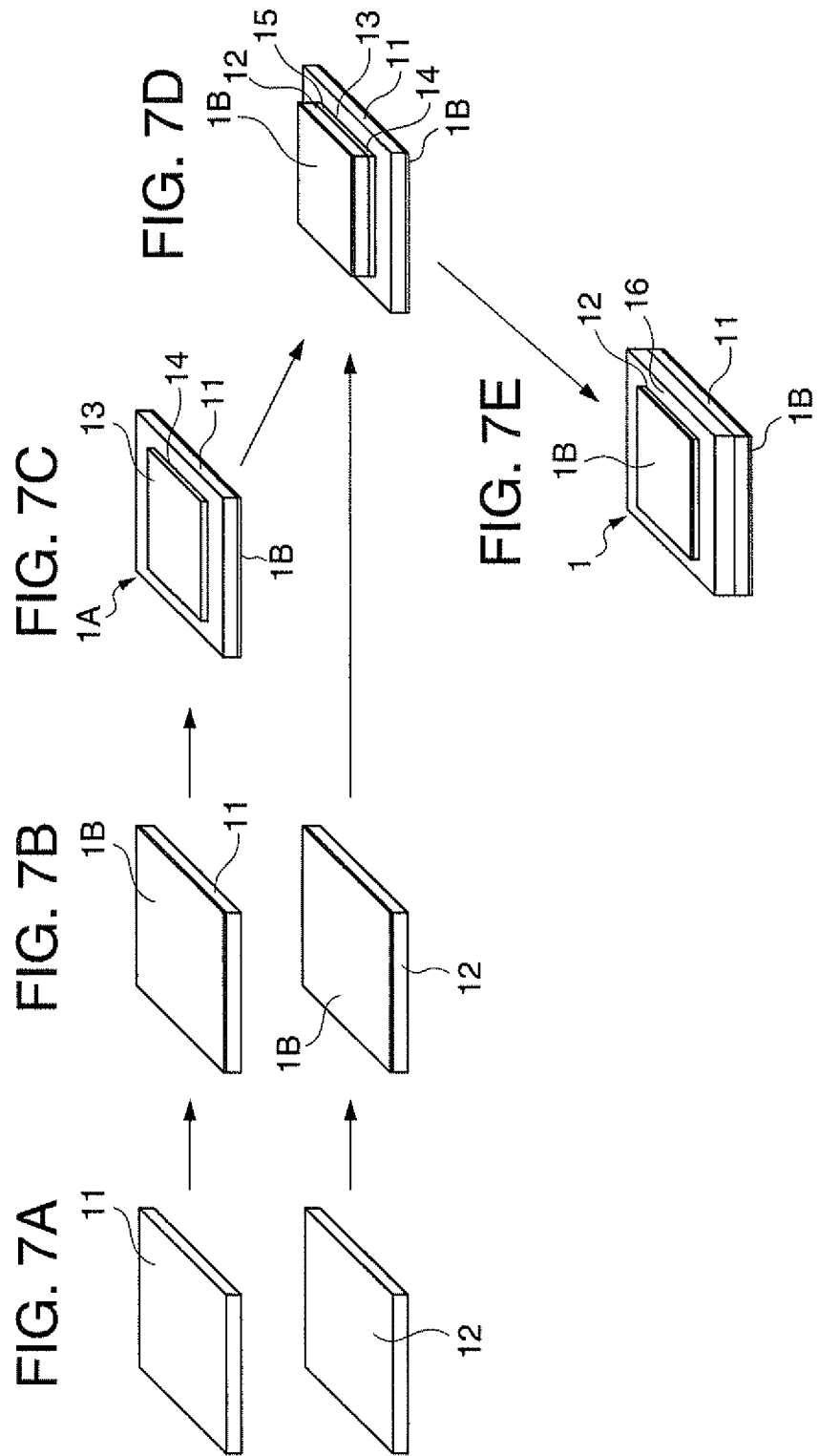
FIGS. 7A to 7E are schematic views showing a procedure for producing the optical device according to the second embodiment.

FIG. 6 is a cross section of an optical device 1 according to the second embodiment.

In FIG. 6, the optical device 1 is a polarizing plate provided with: a first substrate 11; a second substrate 12; a polarizing layer 13 as a synthetic resin layer; a first bonding layer 14 which bonds the first substrate 11 to one principal surface of the polarizing layer 13; a second bonding layer 15 which bonds the second substrate 12 to the other principal surface of the polarizing layer 13; a sealing section 16 provided in an exposed portion of the polarizing layer 13, which is not in contact with the first bonding layer 14 and the second bonding layer 15.

In the second embodiment, the second substrate 12, the polarizing layer 13, the first bonding layer 14, and the second bonding layer 15 are formed such that the sizes of the plane surfaces thereof are smaller than that of the first substrate 11, and on a step portion formed by the lateral portions of the second substrate 12, the polarizing layer 13, the first bonding layer 14, and the second bonding layer 15 and the plane surface of the first substrate 11, the sealing section 16 is provided along all sides of the first substrate 11.

On the external surface of each of the first substrate 11 and the second substrate 12, an antireflection film 1B is formed. This antireflection film 1B is formed by forming a dielectric multilayer film by, for example, a sputtering method or a vacuum vapor deposition method in the same manner as in the first embodiment.

The sealing section 16 is formed of a sealant made of a material which has fluidity during processing and exhibits a sealing function by being cured after processing, for example, a sealant made of a UV curable resin, a thermosetting resin, a resin which is cured by UV and heat, or the like. Specific examples of such a sealant include thermosetting bonding agents such as ethylene-anhydride copolymers (epoxy resin-based bonding agents such as a thermosetting epoxy resin EP582 manufactured by Cemedine Co., Ltd., a UV curable epoxy resin KR695A manufactured by ADEKA Co., Ltd., a UV curable epoxy resin TB3025G manufactured by Three Bond Co., Ltd., and a UV curable resin XNR5516Z manufactured by Nagase ChemteX Corporation), urethane resin-based bonding agents, and phenol resin-based bonding agents; and UV curable bonding agents such as silicone resins (such as UV curable silicone, modified silicone resins having a silyl group-terminated polyether, cyanoacrylates, and acrylic resins).

A method for producing the optical device according to the second embodiment having this structure will be described with reference to FIGS. 7A to 7E.

1. Adhesion Step

As shown in FIG. 7A, the first substrate 11 and the second substrate 12 are processed from quartz, sapphire, or the like, and then, as shown in FIG. 7B, the antireflection film 1B is formed on one surface of the first substrate 11 and one surface of the second substrate 12. Then, as shown in FIG. 7C, the other surface of the first substrate 11 and the polarizing layer 13 are bonded to each other with an adhesive, whereby the polarizing plate unit 1A is produced. At this time, the first substrate 11 and the polarizing layer 13 are bonded to each other such that the center of the first substrate 11 coincides with the center of the polarizing layer 13, and a marginal portion where the polarizing layer 13 is not provided is formed in a peripheral portion of the first substrate 11.

2. Plasma-Polymerized Film Formation Step

Subsequently, as shown in FIG. 7D, the second substrate 12 and the polarizing plate unit 1A are bonded to each other.

2-1. Bonding Layer Formation Step

The first bonding layer is formed by a plasma polymerization method on a plane surface of the polarizing layer 13 of the polarizing plate unit 1A, and the second bonding layer is formed by a plasma polymerization method on a plane surface of the second substrate 12. The procedure for forming the bonding layers is the same as in the first embodiment.

2-2. Surface Activation Step

The plasma-polymerized film formed in the bonding layer formation step is activated. Therefore, energy is applied to each of the first bonding layer and the second bonding layer formed of the plasma-polymerized film.

3. Bonding Step

The polarizing layer 13 and the second substrate 12 are bonded to each other so as to integrate the members. Therefore, the polarizing layer 13 and the second substrate 12 are pressed against each other in a state where the first bonding layer and the second bonding layer face each other. By doing this, the first bonding layer and the second bonding layer are bonded to each other, whereby the second bonding layer 15 is formed. After the bonding step, the polarizing layer 13 and the second substrate 12 are pressurized.

Sealing Step

Subsequently, a sealant is applied by an applicator (not shown) to the step portion formed by the lateral surfaces of the second substrate 12, the second bonding layer 15, the polarizing layer 13, and the first bonding layer 14, and the marginal portion of the first substrate 11. By doing this, the sealing section 16 is formed in the peripheries of the second substrate 12, the second bonding layer 15, the polarizing layer 13, and the first bonding layer 14.

Accordingly, in the second embodiment, not only the operation and effect described in (1) to (8) of the first embodiment, but also the following operation and effect can be obtained.

(9) Since the sealing section 16 is provided for sealing with a sealant the lateral portions of the polarizing layer 13, the first bonding layer 14, the second bonding layer 15, and the second substrate 12, the both plane surfaces of the polarizing layer 13 are covered with the first bonding layer 14 and the second bonding layer 15, respectively, and also the lateral surfaces of all sides are sealed by the sealing section 16. Therefore, not only is the heat resistance further improved, but also dew condensation is not caused. As a result, poor appearance can be prevented from occurring, and also deterioration of the transmissibility can be prevented because dew condensation is not caused.

Subsequently, a third embodiment will be described with reference to FIG. 8.

The third embodiment is an example of applying the optical device according to any of the above-described embodiments to a projection-type imaging apparatus (liquid crystal projector).

Figure 8:
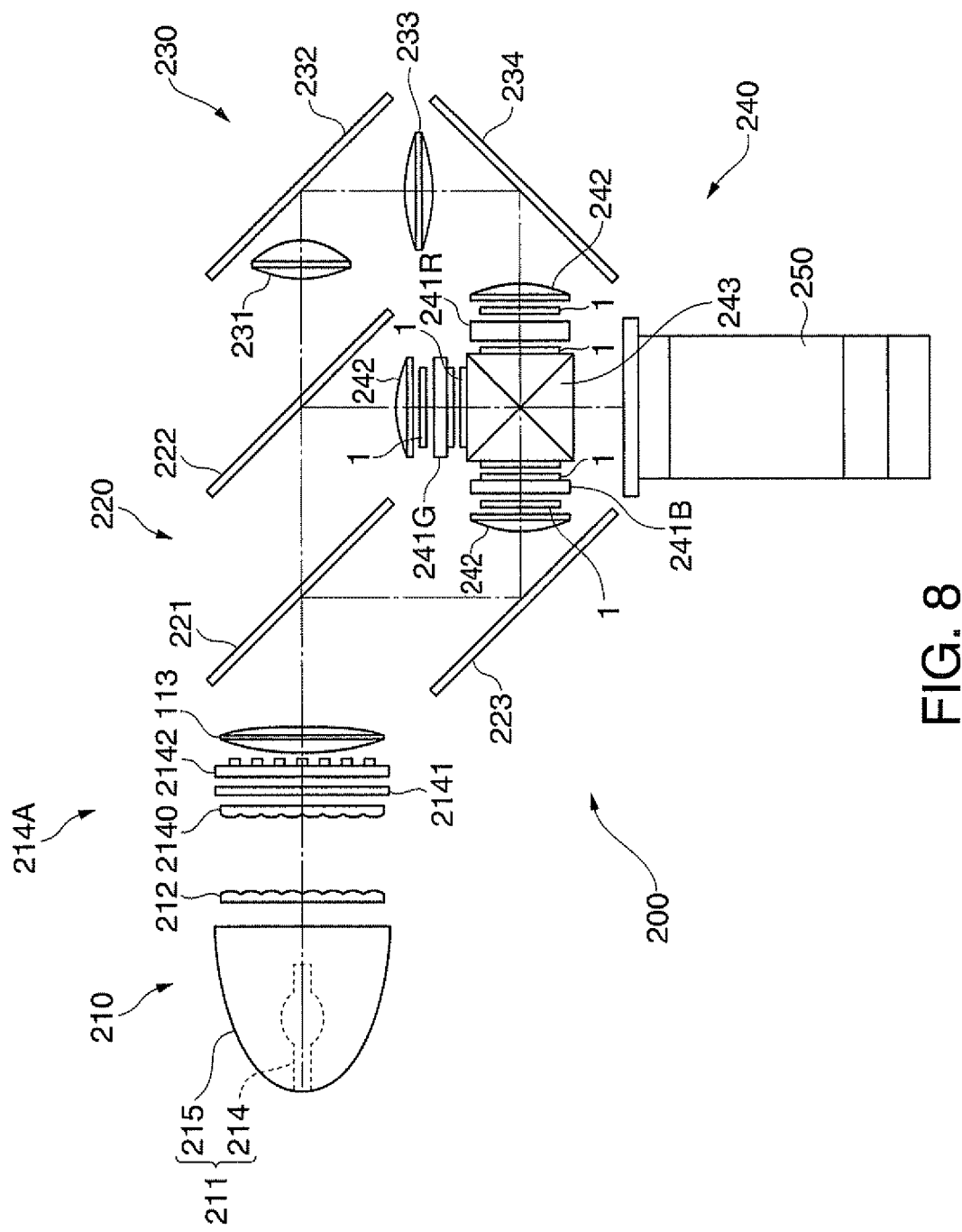
FIG. 8 is a schematic view showing a projection-type imaging apparatus according to a third embodiment of the invention.

FIG. 8 is a view showing a schematic structure of a projection-type imaging apparatus.

In FIG. 8, a projection-type imaging apparatus 200 is provided with an integrator illumination optical system 210, a color separation optical system 220, a relay optical system 230, a light modulator 240 which modulates light emitted from a light source according to image information, and a projection optical device 250 which enlarges and projects the light modulated by the light modulator 240.

The integrator illumination optical system 210 is an optical system for substantially uniformly illuminating image forming regions of three transmissive liquid crystal panels 241R, 241G, and 241B, which will be described later, and is provided with a light source device 211, a first lens array 212, a superposition lens 113, and a polarization converter 214A.

The light source device 211 reflects a radial light beam emitted from a light source lamp 214 with a reflector 215 to form a substantially parallel light beam, and then emits the substantially parallel light beam to the outside.

The polarization converter 214A is provided with a second lens array 2140, a light shielding plate 2141, and a polarization conversion element 2142.

The color separation optical system 220 is provided with two dichroic mirrors 221 and 222 and a reflecting mirror 223, and separates a plurality of light beams emitted from the integrator illumination optical system 210 into light beams of three colors of red, green, and blue by the dichroic mirrors 221 and 222. A blue light component separated by the dichroic mirror 221 is reflected by the reflecting mirror 223, and then passes through a field lens 242 and reaches the transmissive liquid crystal panel 241E for blue.

Among a red light component and a green light component transmitted through the dichroic mirror 221, the green light component is reflected by the dichroic mirror 222, and then passes through the field lens 242 and reaches the transmissive liquid crystal panel 241G for green.

The relay optical system 230 is provided with an incident side lens 231, a relay lens 233, and reflecting mirrors 232 and 234. The red light component separated by the color separation optical system 220 is transmitted through the dichroic mirror 222, and then passes through the relay optical system 230 and further passes through the field lens 242 and reaches the transmissive liquid crystal panel 241R for red light.

The light modulator 240 is provided with the transmissive liquid crystal panels 241R, 241G, and 241B, and a cross dichroic prism 243. The cross dichroic prism 243 combines optical images each modulated for each color light and forms a color optical image.

Three optical devices 1 on an incident side (side of the light source) and three optical devices 1 on an exit side (side of the cross dichroic prism) are arranged so as to sandwich the transmissive liquid crystal panels 241R, 241G, and 241B, respectively.

Each optical device 1 is arranged such that the second substrate 12 is disposed on a light incident side and the first substrate 11 is disposed on a light exit side. In this embodiment, it is necessary to arrange the optical device 1 on both sides of the transmissive liquid crystal panel 241B, however, it is not always necessary to arrange the optical device 1 on both sides of the transmissive liquid crystal panel 241G or 241R.

Accordingly, in the third embodiment, not only the same operation and effect as those described in (1) to (9) of the first and second embodiments, but also the following operation and effect can be obtained.

(10) The projection-type imaging apparatus 200 is configured to include: the light source lamp 214; the light modulator 240 which modulates light from the light source lamp 214; the projection optical device 250 which projects the light modulated by the light modulator 240; and the optical device 1 as the polarizing plate disposed between the light modulator 240 and the light source lamp 214. Therefore, by using the optical device 1 having high transmissibility, the projection-type imaging apparatus 200 having high projection accuracy can be provided.

(11) The optical device 1 is arranged such that the second substrate 12 is disposed on a light incident side and the first substrate 11 is disposed on a light exit side. That is, the second bonding layer 15 formed of a plasma-polymerized film is disposed at a position closer to the light source lamp 214 than the first bonding layer 14 formed of an adhesive, and therefore, even if the optical device 1 is irradiated with light from the light source lamp 214 at a high illumination intensity, the deterioration of the adhesive due to heat or light can be prevented.

(12) The light modulator 240 is configured to include the transmissive liquid crystal panels 241R, 241G, and 241B, and therefore, also in view of this, the projection-type imaging apparatus 200 having high projection accuracy can be provided.

Subsequently, the method for producing an optical device according to a fourth embodiment of the invention will be described with reference to FIGS. 9A to 9D. FIGS. 9A to 9D are schematic views showing a procedure for producing an optical device according to the fourth embodiment of the invention.

In the above-described embodiments, the first bonding layer 151 and the second bonding layer 152 are formed on principal surfaces of both of the polarizing layer 13 and the second substrate 12, respectively, however, in this embodiment, the first bonding layer is formed on one of the polarizing layer 13 and the second substrate 12.

That is, in the fourth embodiment, the first bonding layer 151 containing a structure of siloxane 15B and a leaving group 15C which binds to the structure of siloxane 15B is formed only on the other principal surface of the polarizing layer 13, and the other principal surface of the polarizing layer 13 and the second substrate 12 are bonded to each other through the first bonding layer 151.

First, in the same manner as the above-described embodiments, the first substrate 11 and the polarizing layer 13 are bonded to each other with an adhesive, whereby the polarizing plate unit 1A is formed, and then, the first bonding layer 151 is formed on a principal surface of the polarizing layer 13.

Thereafter, in order to increase the adhesiveness between the first bonding layer 151 and the second substrate 12, one or both of the bonding surfaces of the first bonding layer 151 and the second substrate 12 is/are subjected to a surface treatment.

Figure 9A:
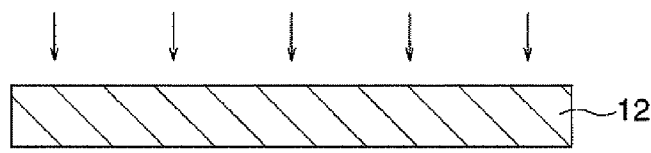
FIGS. 9A to 9D are schematic views showing a procedure for producing an optical device according to a fourth embodiment of the invention.

As shown in FIG. 9A, the bonding surface of the second substrate 12 is subjected to a surface activation treatment according to a constituent material of the substrate. Examples of the surface activation treatment include physical surface treatments such as a sputtering treatment and a blast treatment; and chemical surface treatments such as a plasma treatment using oxygen plasma, nitrogen plasma, or the like, a corona discharge treatment, an etching treatment, an electron beam irradiation treatment, a ultraviolet irradiation treatment, and an ozone exposure treatment.

Figure 9B:
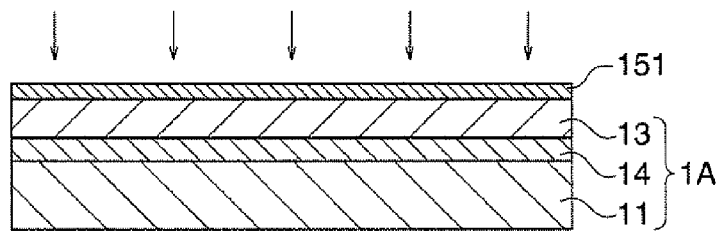

As shown in FIG. 9B, the bonding surface of the first bonding layer 151 is subjected to a surface activation treatment in the same manner as described above. Incidentally, as the surface treatment for the second substrate 12, a treatment for activation similar to the surface activation treatment as described above for the first bonding layer 151 formed on the other principal surface of the polarizing layer 13 can be adopted.

Figure 9C:
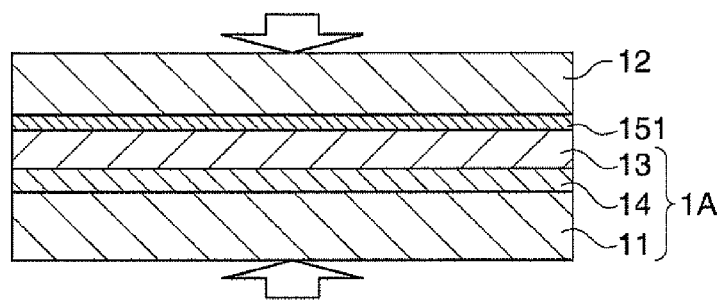
Figure 9D:
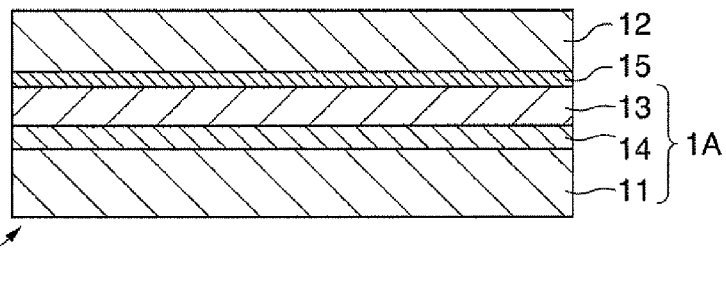

Thereafter, as shown in FIG. 9C, the polarizing layer 13 and the second substrate 12 are pressurized. By doing this, as shown in FIG. 9D, the optical device 1 is produced.

Accordingly, in the fourth embodiment, not only the same operation and effect as those described in (1) to (7) and (9) of the first and second embodiments, but also the following operation and effect can be obtained.

(13) Since the method includes a surface activation step of activating the principal surface on which the first bonding layer 151 is not formed among the other principal surface of the polarizing layer 13 and the principal surface of the second substrate 12, the plasma-polymerized film formation step is simplified, and the polarizing layer 13 and the second substrate 12 can be bonded to each other.

EXAMPLES

Subsequently, in order to confirm the effects of the above-described embodiments, Examples will be described. In the present Examples, conditions for forming the second bonding layer 15 by a plasma polymerization method and effects thereof were confirmed.

Example 1

The substrate temperature during film formation was 65° C., the thickness of the second bonding layer 15 formed of a plasma-polymerized film was 500 nm, the temperature during pressurization was 35° C., and the applied pressure was 30 MPa. The outer appearance of the optical device 1 produced under the above conditions was favorable.

Example 2

The substrate temperature during film formation was 85° C., the thickness of the second bonding layer 15 was 500 nm, the temperature during pressurization was 35° C., and the applied pressure was 30 MPa. The outer appearance of the optical device 1 produced under the above conditions was favorable.

Comparative Example 1

The substrate temperature during film formation was 60° C., the thickness of the second bonding layer 15 was 500 nm, the temperature during pressurization was 35° C., and the applied pressure was 30 MPa. In the optical device 1 produced under the above conditions, fine air bubbles remained in the polarizing layer 13 in the form of a film.

Comparative Example 2

The substrate temperature during film formation was 90° C., the thickness of the second bonding layer 15 was 500 nm, the temperature during pressurization was 35° C., and the applied pressure was 30 MPa. In the optical device 1 produced under the above conditions, an outer peripheral portion of the polarizing layer 13 in the form of a film was shrunk and deformed, and bonding failure was caused.

As described above, from the experimental results of Examples 1 and 2 and Comparative Examples 1 and 2, it is found that the substrate temperature during film formation is preferably 65° C. or higher and 85° C. or lower.

Example 3

The substrate temperature during film formation was 85° C., the thickness of the second bonding layer 15 was 300 nm, the temperature during pressurization was 35° C., and the applied pressure was 30 MPa. The outer appearance of the optical device 1 produced under the above conditions was favorable.

Example 4

The substrate temperature during film formation was 85° C., the thickness of the second bonding layer 15 was 700 nm, the temperature during pressurization was 35° C., and the applied pressure was 30 MPa. The outer appearance of the optical device 1 produced under the above conditions was favorable.

Comparative Example 3

The substrate temperature during film formation was 85° C., the thickness of the second bonding layer 15 was 250 nm, the temperature during pressurization was 35° C., and the applied pressure was 30 MPa. In the optical device 1 produced under the above conditions, streaky air bubbles remained in the polarizing layer 13 in the form of a film.

Comparative Example 4

The substrate temperature during film formation was 85° C., the thickness of the second bonding layer 15 was 750 nm, the temperature during pressurization was 35° C., and the applied pressure was 30 MPa. In the optical device 1 produced under the above conditions, an outer peripheral portion of the polarizing layer 13 in the form of a film was shrunk and deformed, and bonding failure was caused.

As described above, from the experimental results of Examples 3 and 4 and Comparative Examples 3 and 4, it is found that when the thickness of the second bonding layer 15 formed of a plasma-polymerized film is 300 nm or more and 700 nm or less, the irregularities of the polarizing layer 13 in the form of a film can be absorbed, and bonding failure caused by thermal shrinkage deformation can be avoided.

Example 5

The substrate temperature during film formation was 75° C., the thickness of the second bonding layer 15 was 500 nm, the temperature during pressurization was 20° C., and the applied pressure was 30 MPa. The outer appearance of the optical device 1 produced under the above conditions was favorable.

Example 6

The substrate temperature during film formation was 75° C., the thickness of the second bonding layer 15 was 500 nm, the temperature during pressurization was 50° C., and the applied pressure was 30 MPa. The outer appearance of the optical device 1 produced under the above conditions was favorable.

Comparative Example 5

The substrate temperature during film formation was 75° C., the thickness of the second bonding layer 15 was 500 nm, the temperature during pressurization was 55° C., and the applied pressure was 30 MPa. In the optical device 1 produced under the above conditions, the adhesive constituting the first bonding layer 14 protruded from the outer periphery, and the outer appearance was poor.

As described above, from the experimental results of Examples 5 and 6 and Comparative Example 5, it is found that when the temperature during pressurization is too high, the adhesive is plastically deformed due to heat, and protrudes from the outer periphery by the pressurization force. Incidentally, as the first bonding layer 14 used in Examples 5 and 6 and Comparative Example 5, an acrylic adhesive was used.

Example 7

The substrate temperature during film formation was 75° C., the thickness of the second bonding layer 15 was 500 nm, the temperature during pressurization was 35° C., and the applied pressure was 30 MPa. The outer appearance of the optical device 1 produced under the above conditions was favorable.

Comparative Example 6

The substrate temperature during film formation was 75° C., the thickness of the second bonding layer 15 was 500 nm, the temperature during pressurization was 35° C., and the applied pressure was 2.5 MPa. In the optical device 1 produced under the above conditions, streaky air bubbles remained in the polarizing layer 13 in the form of a film.

As described above, from the experimental results of Example 7 and Comparative Example 6, it is found that with respect to the irregularities of the polarizing layer 13 in the form of a film, it is necessary to adhere the boundary surface between the polarizing layer 13 and the second substrate 12, and therefore, a pressurization force of 3 MPa or more is needed.

The conditions and results of Examples 1 to 7 and Comparative examples 1 to 6 are summarized in Table 1.

TABLE 1

| | | Film formation | | Pressurization | | Results |
|---|---|---|---|---|---|---|
| | | Substrate temperature (° C.) | Thickness (nm) | Temperature (° C.) | Pressure (MPa) | Outer appearance |
| | Optimal range | 65 to 85 | 300 to 700 | 20 to 50 | 3 or more | |
| Conditions for substrate temperature during film formation was changed | Example 1 | 65 | 500 | 35 | 30 | Favorable |
| | Example 2 | 85 | 500 | 35 | 30 | Favorable |
| | Comparative Example 1 | 60 | 500 | 35 | 30 | Fine air bubbles |
| | Comparative Example 2 | 90 | 500 | 35 | 30 | Bonding failure in outer periphery |
| Conditions for film thickness during film formation was changed | Example 3 | 85 | 300 | 35 | 30 | Favorable |
| | Example 4 | 85 | 700 | 35 | 30 | Favorable |
| | Comparative Example 3 | 85 | 250 | 35 | 30 | Streaky air bubbles |
| | Comparative Example 4 | 85 | 750 | 35 | 30 | Bonding failure in outer periphery |
| Conditions for temperature during pressurization was changed | Example 5 | 75 | 500 | 20 | 30 | Favorable |
| | Example 6 | 75 | 500 | 50 | 30 | Favorable |
| | Comparative Example 5 | 75 | 500 | 55 | 30 | Protrusion of adhesive |
| Applied pressure was changed | Example 7 | 75 | 500 | 35 | 30 | Favorable |
| | Comparative Example 6 | 75 | 500 | 35 | 2.5 | Streaky air bubbles |

Subsequently, Experimental Examples for the evaluation of reliability will be described with reference to FIGS. 10A to 13B.

In this experiment, the variation in transmittance was compared between the optical device 1 of Example produced according to the above embodiment and an optical device of the related art in which a first substrate, a second substrate, and a polarizer in the form of a film composed of PVA are bonded and fixed to one another with a UV curable bonding agent.

The variation in transmittance was measured in accordance with the xenon arc lamp type light resistance test specified in JIS B 7754, and the variation in transmittance versus the time of exposure to the atmosphere was determined. In this experiment, a black panel temperature was set to 63° C.

FIGS. 10A and 10B show the variation in transmittance versus the time of exposure to the atmosphere for green (a green wavelength region) of the present Example, and FIG. 10A is a graph showing the variation in transmittance for the parallel component and FIG. 10B is a graph showing the variation in transmittance for the perpendicular component.

As shown in FIG. 10A, the transmittance for the parallel component varies by only −0.05% even if the exposure time to the atmosphere progresses and is found to vary little.

As shown in FIG. 10B, the transmittance for the perpendicular component does not vary even if the exposure time to the atmosphere progresses (0.00%).

Figure 11A:
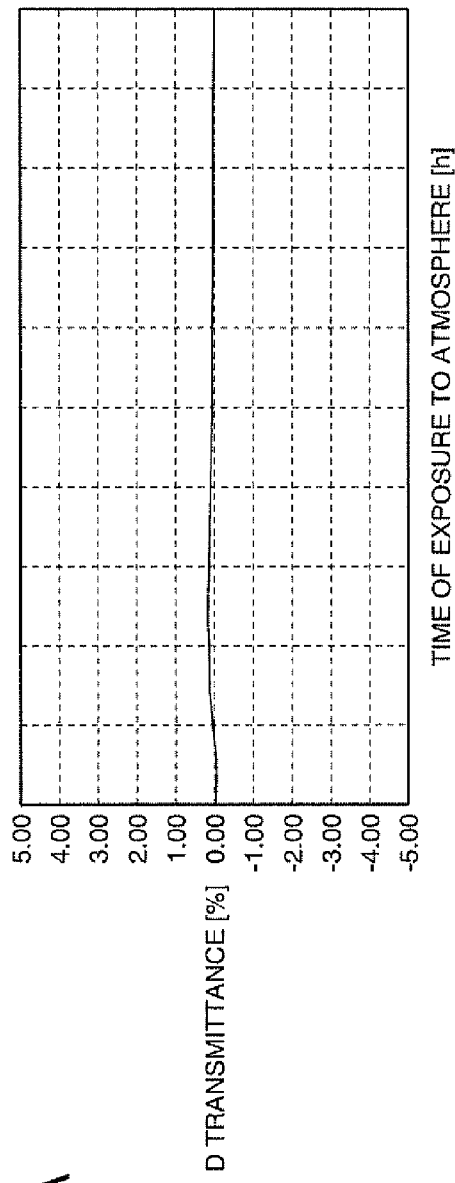
FIGS. 11A and 11B are graphs showing the results of Example for the evaluation of reliability.
Figure 11B:
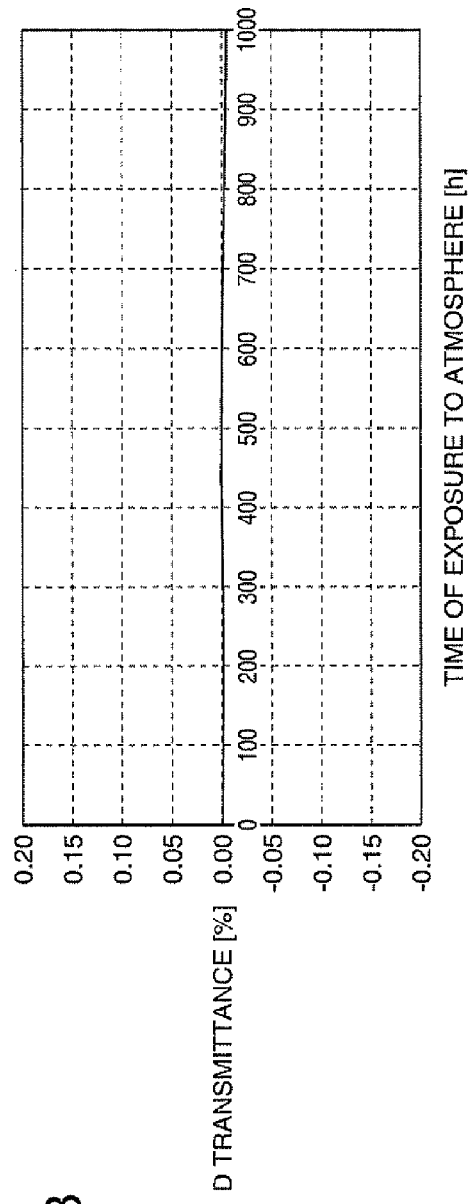

FIGS. 11A and 11B show the variation in transmittance versus the time of exposure to the atmosphere for blue (a blue wavelength region from 430 nm to 500 nm) of the present Example, and FIG. 11A is a graph showing the variation in transmittance for the parallel component and FIG. 11B is a graph showing the variation in transmittance for the perpendicular component.

As shown in FIG. 11A, the transmittance for the parallel component varies by only 0.06% even if the exposure time to the atmosphere progresses and is found to vary little.

As shown in FIG. 11B, the transmittance for the perpendicular component varies by only −0.01% even if the exposure time to the atmosphere progresses and is found to vary little.

Figure 12A:
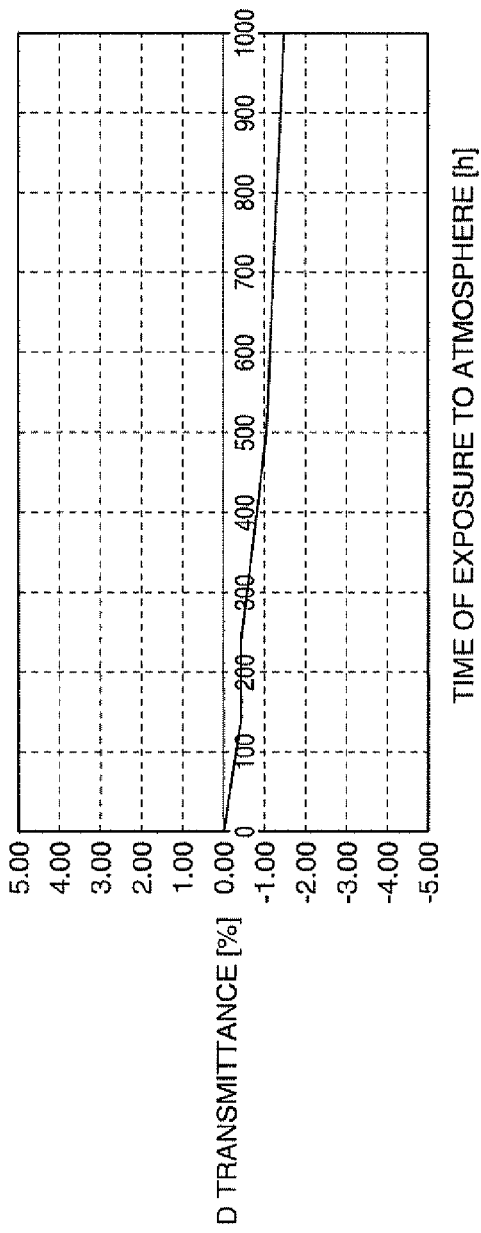
FIGS. 12A and 12B are graphs showing the results of Comparative Example for the evaluation of reliability.
Figure 12B:
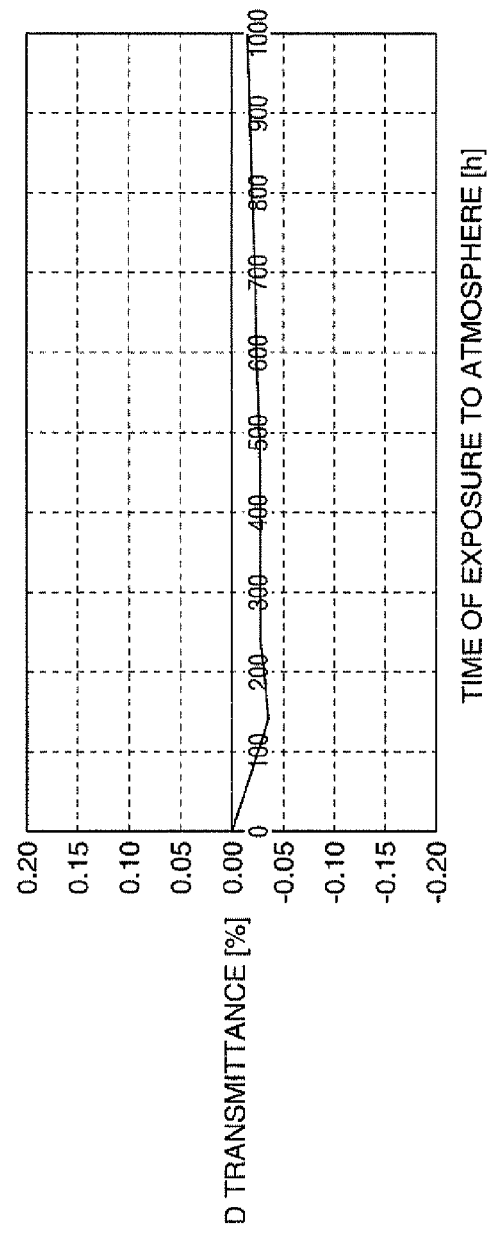

FIGS. 12A and 12B show the variation in transmittance versus the time of exposure to the atmosphere for green (a green wavelength region) of Comparative Example, and FIG. 12A is a graph showing the variation in transmittance for the parallel component and FIG. 12B is a graph showing the variation in transmittance for the perpendicular component.

As shown in FIG. 12A, the transmittance for the parallel component varies by as much as −1.49% as the exposure time to the atmosphere progresses.

As shown in FIG. 12B, the transmittance for the perpendicular component varies by −0.02% as the exposure time to the atmosphere progresses.

Figure 13A:
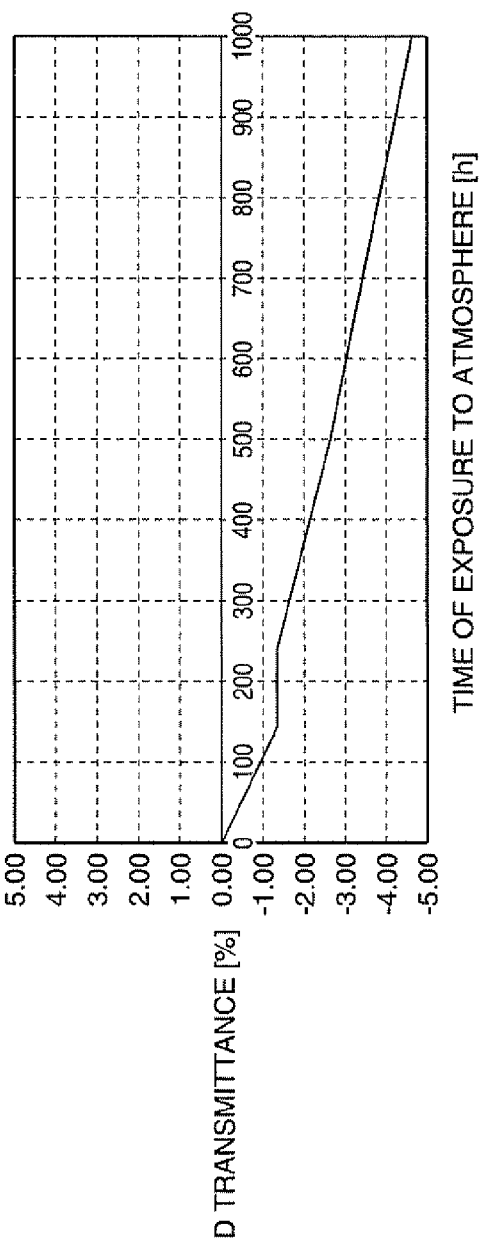
FIGS. 13A and 13B are graphs showing the results of Comparative Example for the evaluation of reliability.
Figure 13B:
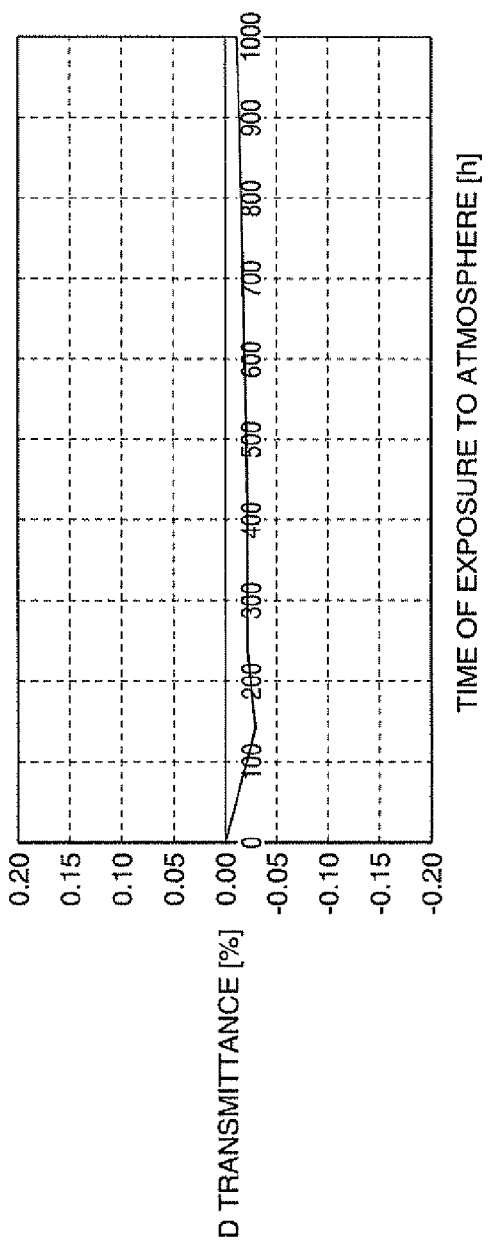

FIGS. 13A and 13B show the variation in transmittance versus the time of exposure to the atmosphere for blue (a blue wavelength region from 430 nm to 500 nm) of Comparative Example, and FIG. 13A is a graph showing the variation in transmittance for the parallel component and FIG. 13B is a graph showing the variation in transmittance for the perpendicular component.

As shown in FIG. 13A, the transmittance for the parallel component varies by as much as −4.57% as the exposure time to the atmosphere progresses.

As shown in FIG. 13E, the transmittance for the perpendicular component varies by −0.01% as the exposure time to the atmosphere progresses.

As described above, when comparison is made between the present Example and Comparative Example for each of the green region and the blue region, it is found that the present Example shows a small variation in transmittance as compared with Comparative Example, and has excellent light resistance.

Note that the invention is not limited to the above-described embodiments and includes modifications described below within a scope capable of achieving the objects of the invention.

For example, in the above-described respective embodiments, as the optical device 1, a polarizing plate is exemplified. However, in the invention, the optical device may be, for example, a retardation plate other than the polarizing plate.

Further, in the above-described respective embodiments, the second bonding layer 15 is formed by a plasma polymerization method. However, in the invention, the second bonding layer 15 may be formed by any of various gas phase film formation methods such as a CVD method and a PVD method, various liquid phase film formation methods, etc. other than the plasma polymerization method.

Further, in the invention, the optical device can be used in electronic apparatuses such as digital cameras other than projection-type imaging apparatuses.

The invention can be utilized in a projection-type imaging apparatus such as a liquid crystal projector and other electronic apparatuses.

The entire disclosure of Japanese Patent Application No. 2011-091173, filed Apr. 15, 2011 is expressly incorporated by reference herein.

What is claimed is:

1. An optical device comprising:
 a light transmissive first substrate;
 a light transmissive second substrate;
 a polarizing layer;
 a first bonding layer which bonds the first substrate to one principal surface of the polarizing layer; and
 a second bonding layer which bonds the second substrate to the other principal surface of the polarizing layer, wherein
 the first bonding layer is an adhesive, and
 the second bonding layer contains a structure of siloxane which has an atomic structure containing a siloxane (Si—O) bond and a leaving group which binds to the structure of siloxane.

2. The optical device according to claim 1, wherein in the second bonding layer, a non-bonding group of the structure of siloxane from which the leaving group is released among the structure of siloxane becomes an active group to bond the second substrate to the other principal surface of the polarizing layer.

3. A projection-type imaging apparatus comprising:
 a light source;
 a light modulator which modulates light from the light source according to image information;
 a projection optical device which projects the light modulated by the light modulator; and
 a polarizing plate disposed between the light modulator and the light source, wherein
 the polarizing plate is the optical device according to claim 2.

4. The optical device according to claim 1, wherein the second bonding layer is formed by a plasma polymerization method.

5. A projection-type imaging apparatus comprising:
 a light source;
 a light modulator which modulates light from the light source according to image information;
 a projection optical device which projects the light modulated by the light modulator; and
 a polarizing plate disposed between the light modulator and the light source, wherein
 the polarizing plate is the optical device according to claim 4.

6. The optical device according to claim 1, wherein the polarizing layer is formed of a synthetic resin selected from a polyvinyl alcohol, a polycarbonate, and a polyolefin.

7. A projection-type imaging apparatus comprising:
 a light source;
 a light modulator which modulates light from the light source according to image information;
 a projection optical device which projects the light modulated by the light modulator; and
 a polarizing plate disposed between the light modulator and the light source, wherein
 the polarizing plate is the optical device according to claim 6.

8. The optical device according to claim 1, wherein the first substrate and the second substrate are formed of an inorganic material.

9. The optical device according to claim 8, wherein the inorganic material is quartz or sapphire.

10. A projection-type imaging apparatus comprising:
 a light source;
 a light modulator which modulates light from the light source according to image information;
 a projection optical device which projects the light modulated by the light modulator; and
 a polarizing plate disposed between the light modulator and the light source, wherein
 the polarizing plate is the optical device according to claim 9.

11. A projection-type imaging apparatus comprising:
 a light source;
 a light modulator which modulates light from the light source according to image information;
 a projection optical device which projects the light modulated by the light modulator; and
 a polarizing plate disposed between the light modulator and the light source, wherein
 the polarizing plate is the optical device according to claim 8.

12. The optical device according to claim 1, wherein a sealing section is provided for sealing with a sealant an exposed portion of the polarizing layer, which is not in contact with the first bonding layer and the second bonding layer.

13. A projection-type imaging apparatus comprising:
 a light source;
 a light modulator which modulates light from the light source according to image information;
 a projection optical device which projects the light modulated by the light modulator; and
 a polarizing plate disposed between the light modulator and the light source, wherein
 the polarizing plate is the optical device according to claim 12.

14. The optical device according to claim 1, wherein the second bonding layer has a thickness of 300 nm or more and 700 nm or less.

15. A projection-type imaging apparatus comprising:
a light source;
a light modulator which modulates light from the light source according to image information;
a projection optical device which projects the light modulated by the light modulator; and
a polarizing plate disposed between the light modulator and the light source, wherein
the polarizing plate is the optical device according to claim 1.

16. The projection-type imaging apparatus according to claim 15, wherein the optical device is arranged so that the second substrate is disposed on a light incident side and the first substrate is disposed on a light exit side.

17. The projection-type imaging apparatus according to claim 15, wherein the light modulator is a liquid crystal panel.

18. A method for producing an optical device, which is a method for producing the optical device according to claim 1, comprising:
an adhesion step of bonding the first substrate to one principal surface of the polarizing layer with an adhesive;
a first bonding layer formation step of forming a first bonding layer, which contains a structure of siloxane that has an atomic structure containing a siloxane (Si—O) bond and a leaving group that binds to the structure of siloxane, on at least one principal surface of the other principal surface of the polarizing layer and a principal surface of the second substrate;
a first surface activation step of activating the first bonding layer formed in the first bonding layer formation step; and
a bonding step of bonding the polarizing layer to the second substrate so as to integrate the members.

19. The method for producing an optical device according to claim 18, further comprising a surface activation step of activating the principal surface on which the first bonding layer is not formed among the other principal surface of the polarizing layer and the principal surface of the second substrate.

20. The method for producing an optical device according to claim 18, further comprising:
a second bonding layer formation step of forming a second bonding layer, which contains a structure of siloxane that has an atomic structure containing a siloxane (Si—O) bond and a leaving group that binds to the structure of siloxane, also on the principal surface on which the first bonding layer is not formed among the other principal surface of the polarizing layer and the principal surface of the second substrate; and
a second surface activation step of activating the second bonding layer formed in the second bonding layer formation step.

* * * * *